Nov. 21, 1933.　　　V. G. APPLE　　　1,936,148
ELECTRIC BRAKE SERVO MECHANISM
Filed March 1, 1930　　　4 Sheets-Sheet 1

INVENTOR.
Vincent G. Apple
BY
Burton & McConkey
ATTORNEYS

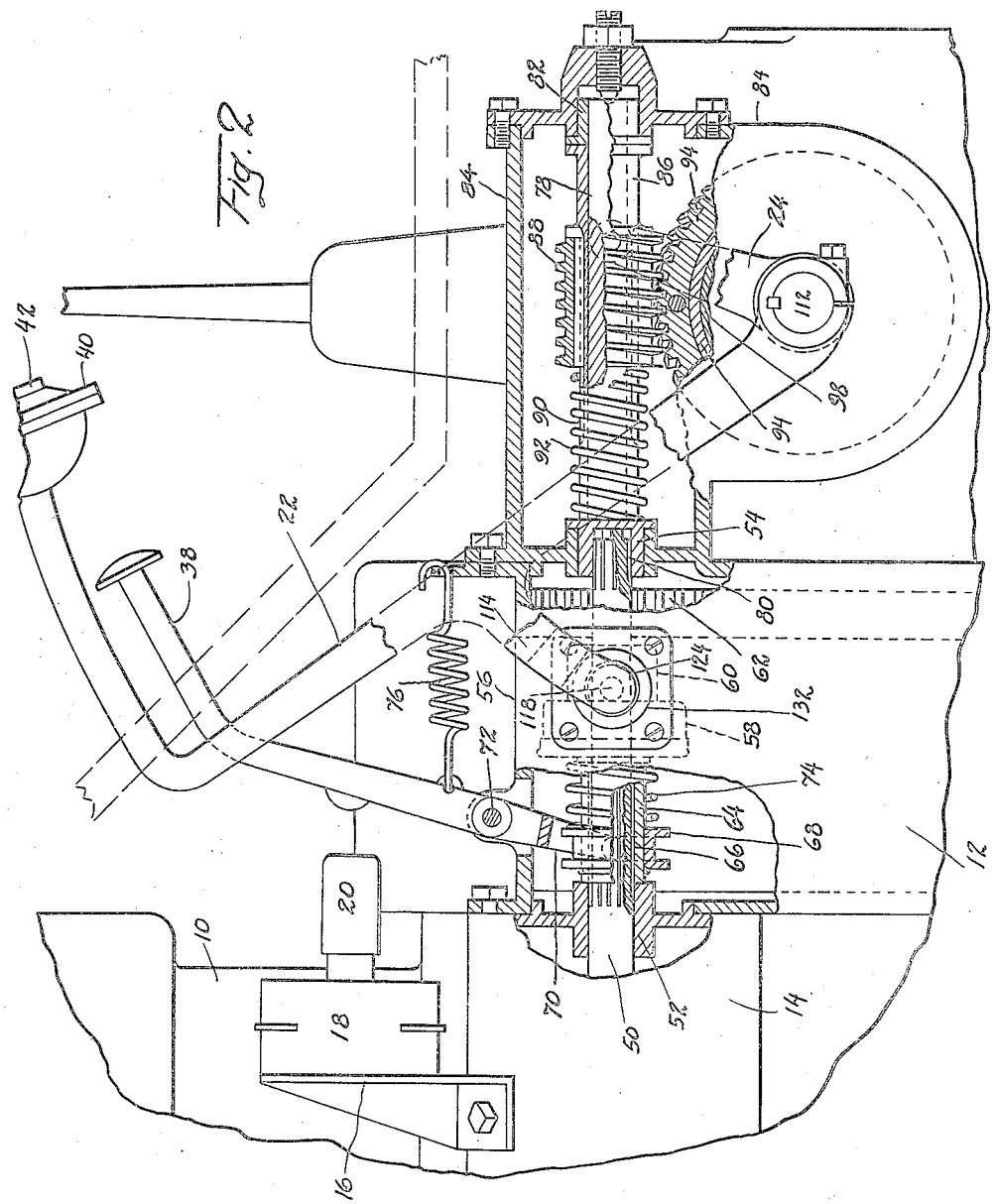

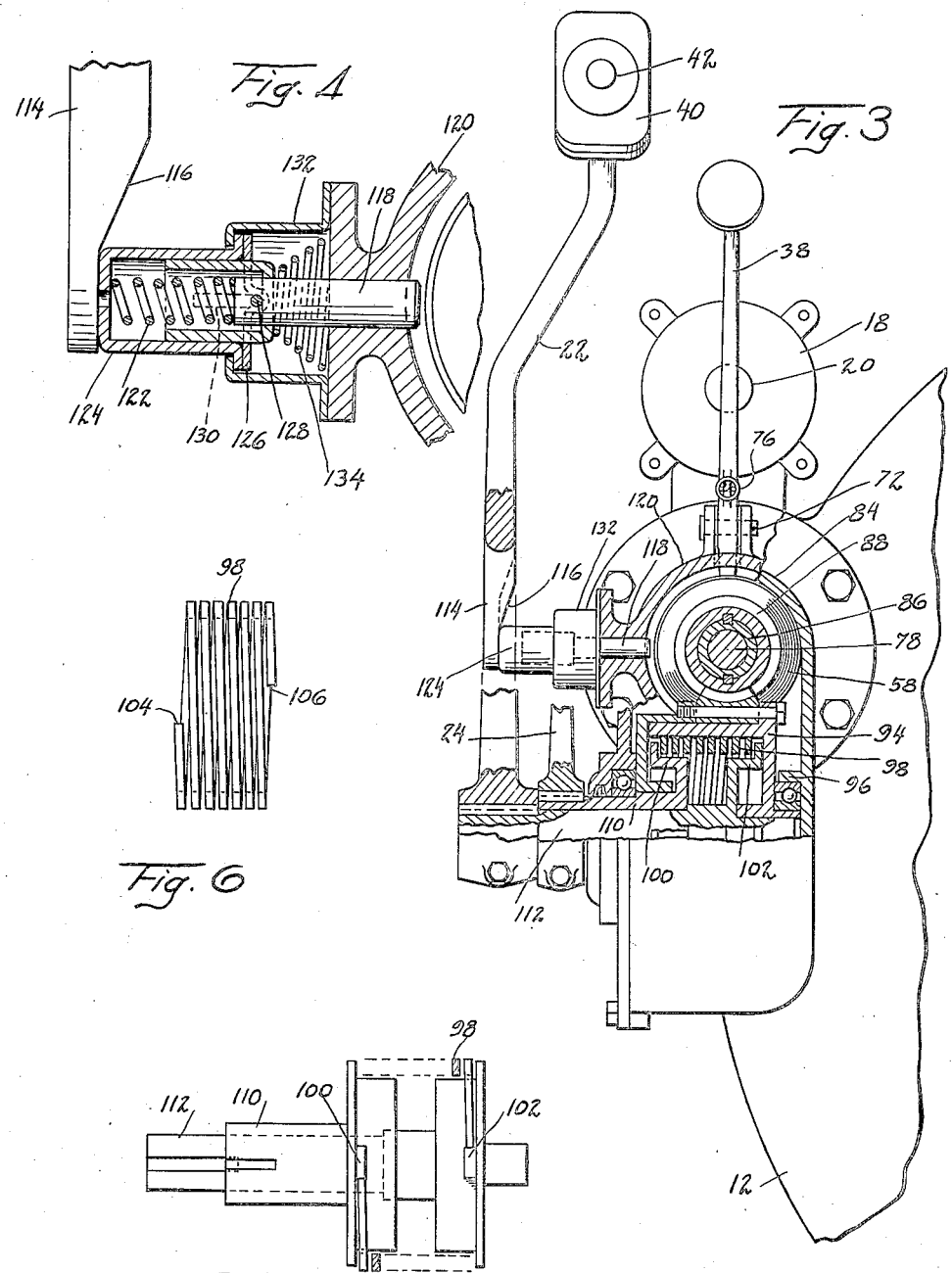

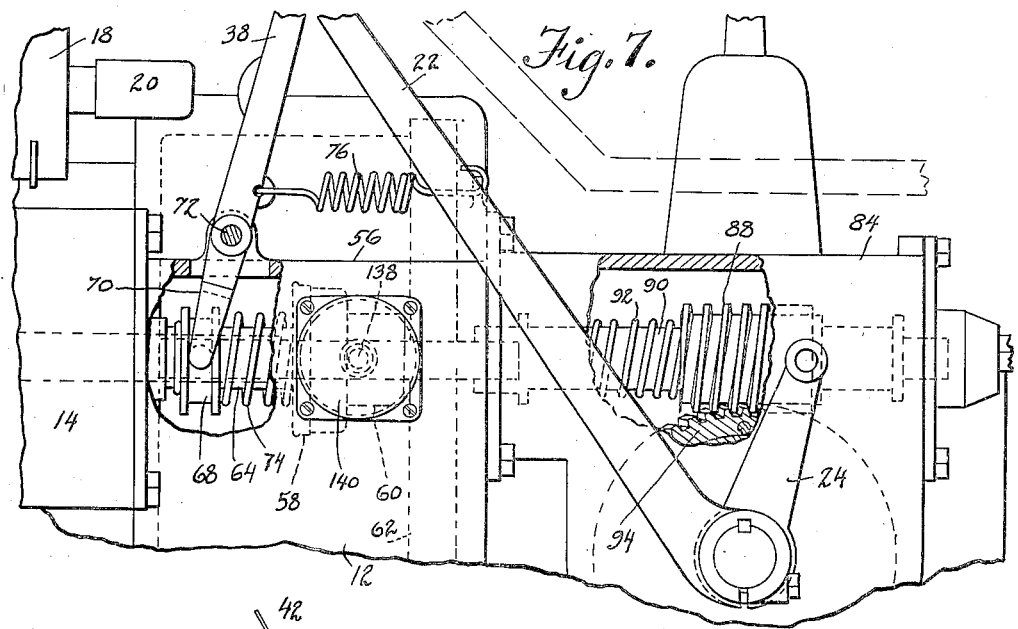
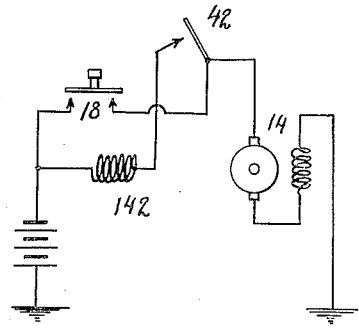
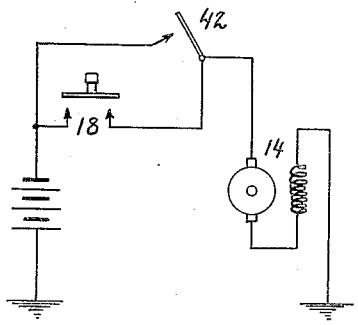
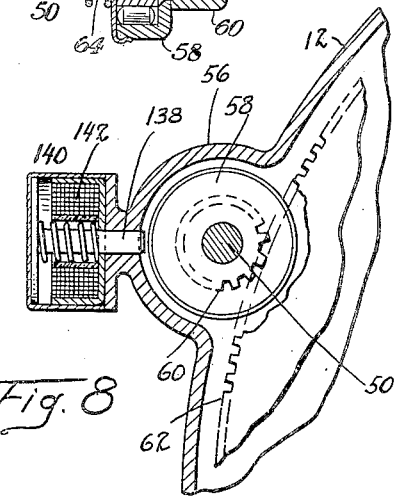

Patented Nov. 21, 1933

1,936,148

UNITED STATES PATENT OFFICE 1,936,148

ELECTRIC BRAKE SERVO MECHANISM

Vincent G. Apple, Dayton, Ohio, assignor to Bendix Brake Company, South Bend, Ind., a corporation of Illinois Application March 1, 1930. Serial No. 432,295

7 Claims. (Cl. 188—156)

My invention relates to automotive vehicle mechanism and has particular reference to the engine and brake control mechanism thereof.

An object of my invention is to so arrange in combination brake applying mechanism that a substantially conventional electric starting motor may be utilized not only to crank the engine of the vehicle, but to apply the brakes as well.

Still another object of my invention is to improve the structure disclosed in my copending applications Serial No. 336,298, filed January 30, 1929, and Serial No. 432,294, filed March 1, 1930, to permit rotation of the starting motor in a single direction to both apply the brakes and to crank the engine. In this way I eliminate the necessity of reversing the circuit through the motor for each operation, as well as providing circuits for such reversal.

In accomplishing this last object I have found it advisable to provide means automatically responsive to the operation of a manual brake applying member for locking the starter pinion in inoperative position. In this way the possibility of throwing the starter pinion into contact with the rotating ring gear of the engine fly wheel when the engine is going and the brakes are being applied is eliminated. While the inventive concept is in no way limited to the particular locking means disclosed, I contemplate the use of either manually or power operated means for performing this function.

Still a further object of my invention is to so couple the starting motor with the brake applying shaft of my braking system that the power transmitted from the motor to the brakes upon operation of a conventional brake pedal is directly proportional to the manual effort applied to said pedal.

In providing for the proportional transmission of power in this way, it is a further object to so arrange the coupling between motor and brake shaft applying mechanism that the brakes may be applied manually through the brake pedal independently of the motor. In this way failure of the motor to operate for any reason will not prevent the operator from braking the vehicle.

Still other meritorious features will become apparent from the following description in conjunction with the drawings wherein like numerals refer to like parts throughout the several figures and wherein:

Fig. 2 is a side elevation partly in section,

Fig. 3 is a rear elevation partly in section,

Fig. 4 is a detail of my locking mechanism,

Figure 1:
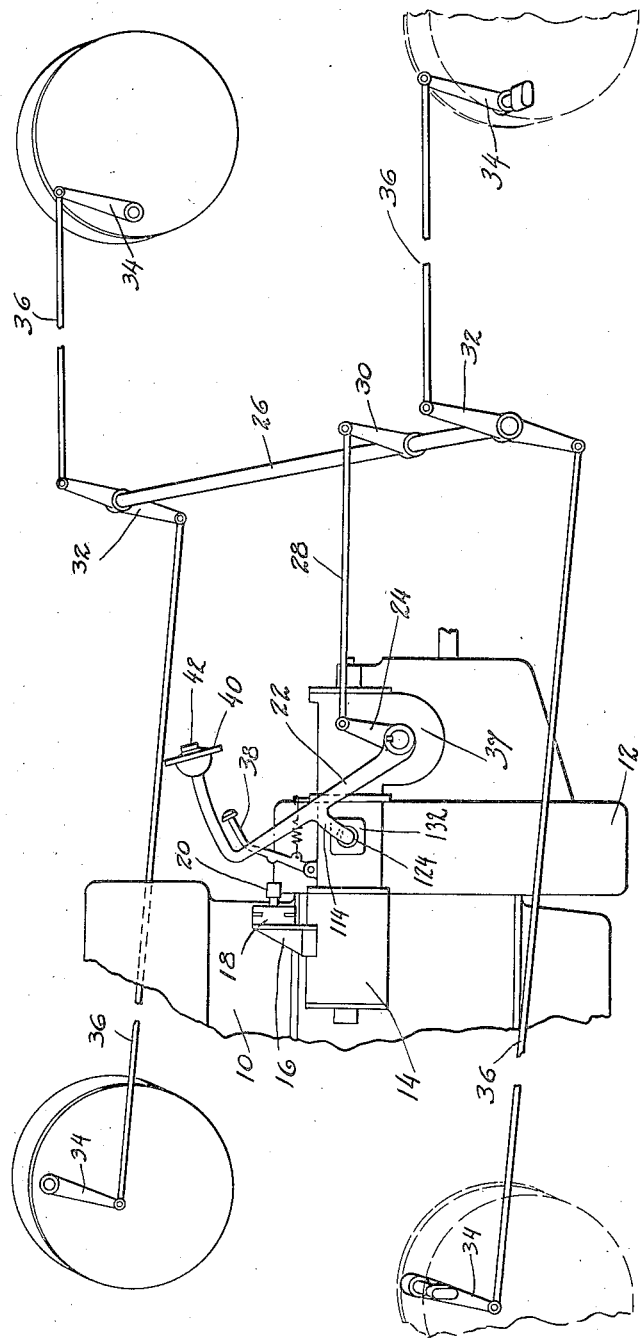
Fig. 1 is a somewhat diagrammatical view of my entire combination.

Fig. 5 is an enlarged detail of my flanged collar which actuates the spring clutch, Fig. 6 is an enlarged side elevation of the clutch spring, Fig. 7 is a side elevation partly in section embodying a somewhat modified form of locking mechanism, Fig. 8 is a detail of this modified locking mechanism, Fig. 9 is a circuit diagram which may be utilized with mechanical locking mechanism, and Fig. 10 is a circuit diagram which may be utilized with electrical locking mechanism.

Fig. 11 is a detail of the one way roller clutch.

As illustrated in Fig. 1 the combination comprises an internal combustion engine 10, the fly wheel casing of which is illustrated by the numeral 12. Secured in some convenient manner to the chassis is an electric starting motor 14 to which is secured by means of the bracket 16, which is here shown as mounted on the electric motor, a switch 18 which is actuated by switch plunger 20. The brake pedal 22, when depressed, is adapted to actuate the arm 24 in a manner hereafter to be described which in turn rotates the brake shaft 26 through rod 28 and arm 30. A rod 32 is secured to each extremity of brake shaft 26 and the ends of rod 32 are connected to brake actuating arms 34 on each of the wheels through rods 36. The braking action is assisted by means of the booster mechanism broadly indicated in Fig. 1 by the numeral 37 and hereafter described in detail.

The starter pedal 38 is adapted to actuate the switch plunger 20 after swinging through a predetermined arc for purposes hereafter described. The switch 18 is adapted to close an electric circuit through the motor 14 to rotate the starting pinion which has previously been slid into mesh with the ring gear of the engine fly wheel during the initial movement of starter pedal 38. The tread plate 40 of brake pedal 22 is provided with a switch 42. This switch is closed when pressure is exerted upon the pedal to close a circuit in the same direction through motor 14, and upon subsequent depression of pedal 22 the rotating motor and servo mechanism 37 are coupled to assist in the application of the brakes.

The extended armature shaft 50 of motor 14 is mounted in the bearings 52 and 54 provided in the gear housing 56. Secured to the shell 58 of an overrunning clutch assembly is the starter pinion 60, which is adapted to be slid along the shaft 50 into mesh with the ring gear 62 of the fly wheel. The camming member 64 of the overrunning clutch assembly is splined to shaft 50 as indicated at 66. A groove collar 68 is secured on one end of camming member 64 to co-act with the forked extremity 70 of starter pedal 38. Starter pedal 38 is pivoted as at 72 in such a way that the movement of the forked extremity 70 as the starter pedal 38 moves into contact with switch plunger 20 is normally sufficient to slide the pinion 60 into mesh with the ring gear 62 through the medium of spring 74. If the pinion is not in a position to mesh with the ring gear but simply abuts the same without sliding into mesh, it is obvious that the coil spring 74 will yield as the movement of starter pedal 38 continues. When switch pedal 20 is actuated by the starter pedal and a circuit is made through the motor 14 the pinion and ring gear will immediately slide into mesh upon the rotative movement of the pinion. After the engine is started it will cause the clutch 58 to overrun until the starter pedal 38 is withdrawn through the retraction spring 76.

The shaft 78 is splined to one extremity of shaft 50, as indicated at 80, and has bearings 54 and 82 at opposite ends of the booster mechanism housing 84. A sleeve 86 is fixed to the shaft 78 and to it is fixed a worm 88, which is adapted to be slid axially to the left. The enlarged portion 90 of the shaft 78 is slightly smaller than the diameter of the bore of the worm 88 so that the worm may slide thereover. The spring 92 maintains the worm 88 in its normal position as indicated in Fig. 2.

A worm wheel 94 has its rotative bearing in the hub 96 of booster housing 84. For the purpose of obtaining brake applying energy from the worm wheel 94 a coil spring clutch is utilized. This clutch comprises a rectangular spring 98 which is normally free to revolve within the bore of worm wheel 94, but which may be expanded to fit the bore tightly upon relative rotative movement of flanged members 100 and 102. The ends of the coil spring 98 are cut off squarely as at 104 and 106, and these square ends are adapted to be engaged by the flanged members 100 and 102, as clearly indicated in Fig. 5. The flanged member 100 is secured to the brake operating arm 24 by being splined to the hub 110 of said member. The brake pedal 22 is splined to shaft 112 which is integral with the flanged member 102.

It is thus obvious that depression of brake pedal 22 will result in relative rotative movement between the flanged members 100 and 102 to expand the coil spring 98 tightly against the bore of worm wheel 94. Closing of the switch 42 starts the electric motor 12 and thereby rotates the worm 88 which in turn rotates the worm wheel 94. Thus the worm wheel is rotated by the motor on initial contact by the operator with the brake pedal and subsequent depression of the brake pedal functions to expand the clutch spring and through the friction so created transmit power from the rotating worm wheel to the brake operating arm 24.

Means are provided for preventing the starter pinion 60 from sliding out to engage the ring gear of the fly wheel when the brake pedal 22 is depressed to operate the brakes. This is necessary to prevent any possible jamming of the starter, inasmuch as the starting motor shaft rotates in the same direction both to apply the brakes and to crank the engine.

The starter interlock is operated by the brake pedal 22 which has a cam arm 114 having a cam surface 116 adapted to cooperate with the spring loaded plunger 118. This locking mechanism is mounted in the housing 120 which surrounds the starter pinion mechanism.

The plunger 118 has its end drilled to receive a relatively stiff spring 122, one end of which presses against the cup member 124. The cup member is adapted to slide on the outside of the plunger and is fastened to it by spot welding a member 126, provided with a groove to receive the pin 128. The pin 128 is fixed in the plunger 118 and is adapted to slide in a slot 130 of cup member 124. A second cup member 132 is adapted to restrain outward movement of the plunger 118, which is always under the influence of the conical spring 134. This latter spring serves to maintain the plunger 118 in the position shown in Figs. 3 and 4, which is its position when the brake pedal 22 is in "off" position. When the brakes are applied the camming face 116 of camming rod 114 forces the plunger in front of the member 58 of the starter pinion 60, in this way preventing operation of the starter pedal 38. The spring 134 returns the plunger automatically upon release of the brakes.

The spring 122 is stiffer than spring 134 and serves as a yielding mechanism should the plunger 118 become fouled, as might be the case if the member 136 of the starter pinion failed to return to its full "off" position. In such an instance the plunger 118 would come in contact with the cylindrical portion of member 136 and the spring 122 will yield, thus permitting full application of the brakes.

A somewhat modified structure has been illustrated in Figs. 7 and 8, wherein a solenoid plunger 138 is utilized in lieu of the mechanically operated plunger of Figs. 2 and 3. When the brake pedal 22 is depressed the circuit closed includes the solenoid 140, thus functioning to operate the plunger 138 to prevent operation of the starter pedal 38.

Such an electric interlock may be operated in several ways, one of which is to connect the magnet coil 142 of the solenoid in series with the brake pedal switch 42, as illustrated in Fig. 10, so that when the brake pedal switch is closed the interlock prevents jamming the starter pinion during the period of electric braking.

Obviously the brake pedal switch 42 might be of the two circuit type with one circuit for the electric brake and the other for the interlock. Likewise it is contemplated that, when utilizing a brake pedal switch of the two circuit type, the magnet coil 142 may also be connected in parallel with the ignition circuit thus providing a double interlock and preventing operation of the starter pedal 38 at any time the engine is running under its own power.

While I have illustrated preferred embodiments of my invention, other modifications will be apparent to those skilled in the art and for that reason I intend to limit myself only within the scope of the appended claims.

I claim:

1. Automotive vehicle mechanism comprising, in combination, an internal combustion engine, a motor, brakes, means to connect the motor to the engine to start the engine, means to couple the motor to the brakes to operate the same, and means automatically responsive upon operation of said latter coupling means to positively prevent connection between the motor and engine.

2. Automotive mechanism comprising, in combination, a motor, an engine, brakes, manually operable means for first engaging said motor with said engine and subsequently closing a circuit through the motor, manually operable means for first closing a similar circuit through said motor and subsequently coupling it with the brakes, said second manually operable means including means for positively preventing engagement between the motor and the engine.

3. Automotive mechanism comprising, in combination, a motor, an engine, brakes, manually operable means for first engaging said motor with said engine and subsequently closing a circuit through the motor, manually operable means for first closing a similar circuit through said motor and subsequently coupling it with the brakes, said second manually operable means including means for positively preventing engagement between the motor and the engine, and means operable by said second manually operable means for applying the brakes independently of its coupling with the motor.

4. Automotive mechanism including, in combination, an internal combustion engine, an electric motor, brakes, manually operable means for coupling the motor and engine, means operative by said first means upon completion of such coupling to close a circuit through the motor, manually operable means for coupling said motor and brakes to actuate the latter, and means responsive to operation of said last means for positively preventing coupling of the engine and motor.

5. Automotive mechanism including, in combination, an internal combustion engine, an electric motor, brakes, manually operable means for coupling the motor and engine, means operative by said first means upon completion of such coupling to close a circuit through the motor, manually operable means for coupling said motor and brakes to actuate the latter, said means including means operable upon initial operation thereof to close a circuit through the motor and subsequently gradually increase the power of the coupling, and means responsive to operation of the brake coupling means to positively prevent coupling of the engine and motor.

6. Automotive mechanism including, in combination, an internal combustion engine, an electric motor, brakes, manually operable means for coupling the motor and engine, means operative by said first means upon completion of such coupling to close a circuit in one direction through the motor, manually operable means for coupling said motor and brakes to actuate the latter, said means including means operable upon initial operation thereof to close a circuit in the same direction through the motor and subsequently gradually increase the power of the coupling.

7. Automotive mechanism including, in combination, an internal combustion engine, brakes, an electric motor adapted on rotation in one direction to be coupled with either the engine or the brakes, manually operable means for coupling the motor with the engine to start the same, and a second manually operable means for coupling the motor with the brakes to apply the same.

VINCENT G. APPLE.